United States Patent [19]

Lundgren

[11] Patent Number: 4,648,297
[45] Date of Patent: Mar. 10, 1987

[54] METHOD AND APPARATUS FOR CROPPING THE LEADING AND TRAILING ENDS OF FAST-TRAVELLING ROLLED GOODS

[75] Inventor: Nils L. Lundgren, Malmö, Sweden

[73] Assignee: Centro-Morgardshammar AB, Smedjebacken, Sweden

[21] Appl. No.: 746,056

[22] Filed: Jun. 18, 1985

[30] Foreign Application Priority Data

Jul. 9, 1984 [SE] Sweden .................... 8403634

[51] Int. Cl.⁴ .................................... B23D 25/04
[52] U.S. Cl. .................................... 83/27; 83/37; 83/106; 83/288; 83/338
[58] Field of Search ............ 83/338, 337, 37, 38, 83/288, 27, 106

[56] References Cited

U.S. PATENT DOCUMENTS

| | | | |
|---|---|---|---|
| 976,653 | 11/1910 | Hilgers | 83/337 |
| 2,328,164 | 8/1943 | Perkins et al. | 83/338 |
| 3,561,311 | 2/1971 | Nowak | 83/338 |
| 3,834,260 | 9/1974 | Sievrin | 83/288 |
| 4,392,399 | 7/1983 | Wyzgol et al. | 83/106 |

FOREIGN PATENT DOCUMENTS

| | | | |
|---|---|---|---|
| 258080 | 3/1913 | Fed. Rep. of Germany | 83/337 |
| 389989 | 11/1976 | Sweden . | |
| 81030066 | 5/1981 | Sweden . | |
| 745607 | 7/1980 | U.S.S.R. | 83/338 |

*Primary Examiner*—James M. Meister
*Attorney, Agent, or Firm*—Young & Thompson

[57] ABSTRACT

The front and tail ends of fast travelling rolled goods (3) such as wire rod are cropped by leading the rolled goods into a guide groove (2) extending around the periphery of a circular disc (1). The disc rotates at the same peripheral speed as the linear speed of the rolled goods. The rolled goods are positively guided in this position and are caused to accompany the disc over a sector (24). The rolled goods are sheared by a cam-operated punch (8) carried by the disc, the punch moving parallel to the axis of the disc. The separated end pieces (22) of the rolled goods are lead away in one direction, and the cropped rolled goods (23) are lead away in another direction.

10 Claims, 5 Drawing Figures

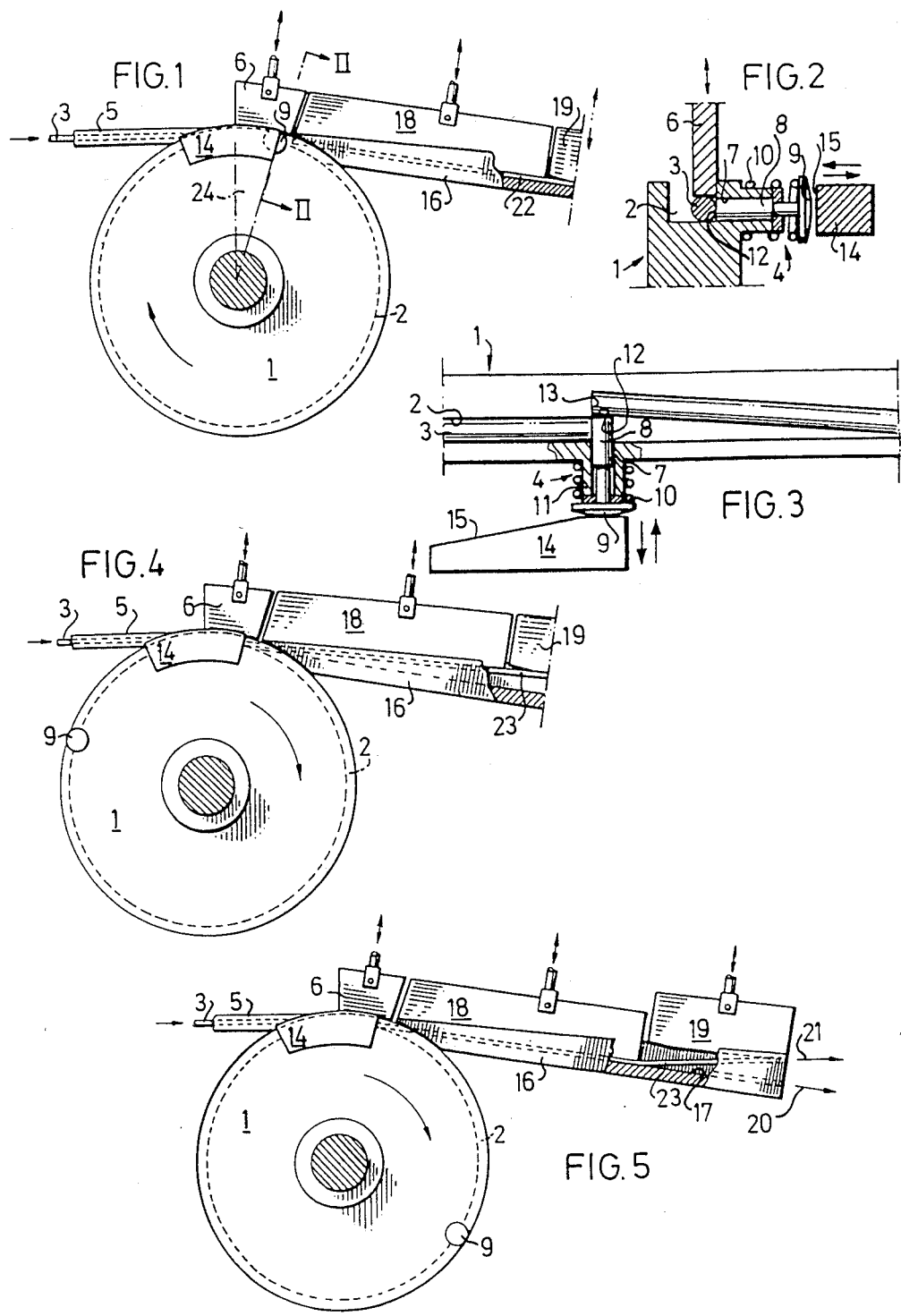

METHOD AND APPARATUS FOR CROPPING THE LEADING AND TRAILING ENDS OF FAST-TRAVELLING ROLLED GOODS

Because of shortcomings inherent in the process technique of hot-rolling light section stock, such as rod of small cross-sectional area, in particular wire-rod, the front and tail ends of the goods become exposed to dimensional errors and other troublesome defects. Consequently, in order to be able to effect subsequent cold-working of the goods it is necessary to remove these defective end-pieces therefrom. In the production of rolled wire-rod it is desirable to remove the aforesaid defective end-pieces primarily before the wire-rod, is coiled since the task of cropping said end-pieces roll-stand to the coiler is both difficult and time-consuming. Consequently, there exists a need for ways and means whereby pre-determined end-pieces of the rolled goods can be cropped and removed therefrom during passage of the rolled goods from the final roll-pair to the winding-on drum or like device arranged to receive the finished rolled goods.

In modern rolling mills, the hot-rolling of slender wire-rod having diameters from 5 mm up to 7.5 mm is effected at terminal rolling speeds which are often greater than 40 m/s, and often reach 100 m/s, and at temperatures ranging from between 1050° and 1100° C. In order to enable the aforesaid clean-cutting or cropping of the rolled goods to be effected in a satisfactory fashion, it is necessary to observe the following conditions:

1. Both the method and the apparatus for clean-cutting or cropping the rolled goods must be capable of enabling repeated cropping at the high rolling speeds entailed.

2. It must be possible to control the apparatus so that cropping is effected at given points in time with satisfactory accuracy.

3. It must be possible to separate the severed defective end-pieces reliably from the cropped rolled goods to be coiled or to be received in some other way.

4. The rolled goods shall preferably be cut off in a manner such that the shear surfaces extend at right angles to the geometric axis of the rolled goods, so-called straight cuts, although cut surfaces which exhibit a small angle to said axis, i.e. up to 20° can be accepted.

5. The cropping device must be so reliable in operation that stoppage times in the total rolling system are changed to only an insignificant extent when the apparatus is active.

Two kinds of shears are known for clean-cutting or cropping rolled goods, primarily rolled wire-rod, as the wire-rod is rolled-out. The first kind, known from SE-A-389 989, presents obliquely positioned rotatable cylindrical bodies provided with mutually abutting cutter-forming edges, the rolled goods being passed between said cutting edges in a lateral direction so as to crop said goods. As a result of this cutting-edge arrangement, however, the resultant cut surface will be inclined at an angle, and when the rolled goods travels at high speeds the cut angle is too small and the ends of the rolled goods become too pointed to be acceptable. In consequence, the highest rolling speed attainable to produce acceptable cut surfaces is only between 35 and 40 m/s. In other respects, this kind of cropping shears solves the problem relating to time control and separation of the cropped end-pieces of the rolled goods. In addition, the inherent reliability of these cropping shears in operation is extremely good, although lateral movement of the wire-rod some-times causes disturbances which propagate rearwardly through the rolled goods, from the cropping location towards the final roll-stand, resulting in a temporary interruption in operation.

The other kind of cropping shears, which is the kind most often used in practice, has radially arranged steel cutters on each of two co-rotating hubs, which at high rolling speeds must rotate continuously. In order to adopt a cropping position, however, the rolled goods is also forced in this case to execute a lateral movement. Even though the cut surface is at right angles and the cropped end pieces are satisfactorily separated from the cropped rolled goods, operational disturbances of the kind experienced with the previously mentioned kind of cropping shears still occur, even though the rolling speeds in this latter case may be somewhat higher than in the former.

When the rolled-goods path is fixed and the radially arranged steel cutters are adapted to be brought into a shearing or cropping position only temporarily, a good cropping result is obtained even at the highest rolling speeds applied. Despite this, however, cropping shears of this kind have not been accepted by the management of wire-rolling works, because of the poor reliability of the shears in operation, this poor level of reliability being due to the fact that the shears incorporate too many mutually coacting component members to achieve the cropping and separating functions satisfactorily.

Consequently an object of the present invention is to avoid all disadvantages associated with the known techniques, by providing to this end a suitable method for cropping the front and tail ends of a fast-travelling rolled goods, particularly wire-rod, and apparatus suitable for carrying out the method.

Accordingly, there is proposed in accordance with the invention a method which is mainly characterized in that subsequent to passing through the final roll-pair the rolled goods is lead to a guide groove extending around the periphery of a disc which rotates at a peripheral speed corresponding to the speed of the rolled goods, and is permitted to accompany the disc in this position over a sector of the disc, at the end of which the rolled goods is cropped with the aid of a shearing device attached to the disc and active transversely to the guide groove, whereupon the cropped end-pieces are lead away in one direction while the cropped goods is lead away in another direction to a collecting means, for example a winding-on drum. This method enables a straight cut to be obtained while guiding the rolled goods during the actual cropping sequence, which is of the utmost significance since it avoids the occurrence of disturbances which, at high rolling speeds, would have propagated rearwardly in the rolled goods, from the cropping location to the final roll-stand, with subsequent risk of a stoppage in production. The most manifest problems encountered with cropping extremely fast-travelling rolled goods have thus been eliminated.

In order to ensure that the rolled goods is correctly lead into the guide groove extending peripherally around the rotating circular disc, the rolled goods may be caused to pass through a tubular device capable of being aligned relative to the disc and the groove thereon. As a result of so guiding the rolled goods, all form of disturbance-generating lateral movement of the rolled goods is avoided in conjunction with the cropping.

Subsequent to being guided into the groove, the rolled goods accompanies the disc while held in said peripheral groove with the aid of a holding-down means which can be manouvered in a direction radially to the disc, thereby to afford additional security against uncontrollable movement of the rolled goods, such movement being liable to propagate rearwardly therethrough.

The cropping or shearing device mounted on the disc and active transversely to the guide groove may be activated in a number of different ways. However, a particularly simple and reliable method which requires the provision of a minimum of co-acting elements is achieved when the cropping device is activated by means which incorporates a camming surface and which is mounted on one side of the disc and capable of reciprocal movement in the direction of the disc axis.

The method according to the invention also enables the cropped end-pieces of the rolled goods to be removed in a manner which in addition to being entirely novel is also simple and reliable. The rolled goods leaving the disc can namely be lead away between a leader means, having a groove for accommodating the rolled goods and two guide means which co-act with said leader means and which can be manouvered towards and away from said groove, the cropped material being conducted to one guide channel and the severed pieces being conducted to another guide channel, solely by changing the setting of the two manouverable guide means.

For the purpose of carrying out the method there is proposed in accordance with the invention an apparatus suitable herefor, this apparatus being mainly characterized in that it comprises a circular disc arranged downstream of the last roll-pair in a rolling line, said disc being provided with a guide groove around its periphery and being capable of being driven at a peripheral speed corresponding to the speed of the rolled goods, and having mounted thereon a cropping or shearing device which is active transversely to the guide groove.

A particularly suitable embodiment of the apparatus according to the invention includes a tubular member which is located before the driven circular disc, as seen in the movement direction of the rolled goods, and which can be aligned relative to the disc and the peripheral groove thereon, said tubular member being effective to guide the rolled goods into the guide groove on the disc. The rolled goods is thus guided correctly into the peripheral groove on the disc in the simplest and most reliable manner conceivable.

Suitably, there is also provided a holding-down means which can be brought to abut the rolled goods introduced into the peripheral groove on said disc, and which is located externally of the disc periphery and extends over a part thereof and can be moved into and out of contact with the rolled goods in said guide groove in the radial direction of the disc. With the aid of such means it is ensured that the rolled goods introduced into the guide groove of the disc will follow the disc correctly until cropping takes place.

The disc-carried shearing or cropping device, active transversely to the guide groove in said disc, may be formed in many different ways within the scope of the invention. However, in accordance with one particularly simple and reliable embodiment, the cutting device has the form of an element which is arranged for reciprocal movement in the direction of the disc axis in a guide means extending transversely to the guide groove, and which projects partially outside one side of the disc, and there carries a camming surface or the like, and that part of which element located within the guide means presents a cutting edge intended to co-act with a further cutting edge located on the side of the groove wall in the disc opposite to the firstmentioned cutting edge.

This type of cutting off arrangement can be suitably activated by means of cam-provided means mounted on the side of the disc and capable of being manouvered forwards and backwards in the direction of the disc axis, wherewith a return spring should be provided in a known manner for returning the cutting off device, upon completion of a cropping movement, to its rest position in which the rolled goods is able to move in the guide disc without being affected by the cutting device.

For the purpose of moving the severed rolled-goods endpieces away from the cropped goods, one particularly advantageous embodiment of the apparatus according to the invention is provided with a firmly attached guide channel which is located after the disc as seen in the direction of the rolled-goods movement and which presents a rolled-goods accommodating groove over which there are arranged two closed guide one behind the other, which can be manouvered towards and away from the groove, and further presents two closed guide channels which are located behind the groove and adjoin said groove and which extend in mutually different directions, of which guide channels, one is intended to lead away severed pieces of rolled goods and the other is intended to lead the cropped rolled goods to a coiler or like device.

The invention will now be described in more detail with reference to an embodiment thereof illustrated in the accompanying drawing.

FIG. 1 is a schematic side-view of a suitable embodiment of an apparatus designed in accordance with the invention;

FIG. 2 is a sectional view taken on the line II—II in FIG. 1 of a shearing device incorporated in said apparatus;

FIG. 3 is a top plan view, with parts omitted and partly in section, of the structure shown in FIG. 2, illustrating the shearing device in action;

FIG. 4 is a side-view corresponding to FIG. 1, illustrating how rolled goods freed of its front end, i.e. cropped, runs through the apparatus; and FIG. 5 illustrates finally the manner of leading away the cropped rolled goods and the preparations undertaken for the cropping and removal of the trail end of the rolled goods.

As illustrated in the drawing, an apparatus for carrying out the method according to the invention for cropping the leading and trail ends of fast-travelling rolled goods, particularly wire-rod or wire, includes a circular disc 1 located downstream of the last roll-stand (not shown) of a rolling mill. The disc 1 has provided around the periphery thereof a guide groove 2 for receiving rolled goods 3, which in the present case is wire-rod of round cross-section. The disc can be driven by means (not shown) at a peripheral speed corresponding to the speed of the rolled goods, and carries a shearing device 4 for severing the rolled goods 3, said device 4 being active transversely to the guide groove 2.

For the purpose of introducing the rolled goods into the guide groove 2 of the circular disc rotating at a peripheral speed corresponding to the speed of the rolled goods, the apparatus is provided with a tubular member 5 which is located ahead of the disc as seen in the travelling direction of the rolled goods and which serves as a leader tube for the rolled goods and can be aligned in relation to the disc 1 and the peripheral guide groove 2 thereon.

In order to ensure that the rolled goods introduced into the guide groove 2 on the disc 1 by means of the leader tube 5 accompanies the guide groove during the rotation of the disc 1, the illustrated apparatus includes a holding-down means 6 which can be brought into abutment with the rolled goods located in the said guide groove and which is located externally of the periphery of the disc 1 and extends over a part thereof and can be manouvered in the radial direction of the disc into and out of contact with the rolled goods in the said guide groove.

In the illustrated embodiment of an apparatus according to the invention, the shearing device 4 carried by the driven rotatable disc 1 and active transversely to the guide groove 2 includes an element 8 which is arranged for reciprocal movement in the axial direction of the disc in a guide means 7 extending transversely to the guide groove, said element 8 being in the form of a plunger having a narrow part which projects externally of one side of the disc and is there provided with a neck portion provided with a camming surface 9. Located between the side of the neck portion facing the disc 1 and the corresponding side of the disc is a helically wound return spring 10. The spring is located around a bead 11 formed on one side of the disc and in which the sheardevice guide means 7 is extended. The return spring 10 is operative in holding the active element of the shearing device 4 in a rest position externally of the guide groove 2 on the periphery of the rotating disc 1. That part of the cutting off element 8 located within the guide means 7 is provided with a cutting edge 12 intended to co-act with a cutting edge 13 located on a part of the groove wall opposite thereto. For the purpose of executing its shearing movements, the plunger-like element 8 of the shearing device 4 provided with the cutting edge 12 is activatable by means of a member 14 which is located on one side of the disc and which is provided with a cam surface 15 facing the camming surface 9 on the shearing device 4, said member 14 being reciprocatingly movable in the direction of the disc axis. The illustrated and described shearing device incorporating a known return spring merely constitutes an example of many embodiments suitable for the purpose intended. The only necessary feature of the device is that it is mounted on the disc and is active transversely to the guide groove, which fundamental conditions can be fulfilled by a large number of manouverable shearing devices of mutually different design.

As will also be seen from the drawing, an apparatus according to the invention is also provided with a guide channel 16, which is firmly mounted behind the disc as seen in the direction of movement of the rolled goods 3, and which presents in connection with the peripheral guide groove 2 on the disc 1 an upwardly open rolled-goods receiving groove 17. Across this groove are arranged, one after the other, two guide means 18,19 arranged for movement towards and away from said groove. The two guide means can. be brought to abut the rolled goods 3 travelling in the leader groove 17, either individually or together. As illustrated, the apparatus also includes downstream of the guide channel 16 firmly mounted downstream of the rotating disc 1, two guide channels 20,21 (not shown in detail) which are located downstream of the leader groove 17 and border thereon, and which extend in mutually different directions, of which channels the one 20 is intended to lead away severed rolled-goods end pieces 22 and the other, 21, is intended to convey cropped rolled goods 23 to a coiler (not shown) or to some other suitable device for receiving the rolled goods.

As will be seen from the drawing and as mentioned in the previous description of the illustrated apparatus, the method for cropping the front and tail ends of a fast-travelling rolled goods in accordance with the invention is effected by introducing rolled goods exiting from the final roll-stand into a guide groove 2 located around the periphery of a circular disc which rotates at a peripheral speed corresponding to the speed of the rolled goods, such that the rolled goods follows the disc through a sector 24 thereof, at the end of which sector the rolled goods is cropped by means of a shearing device 4 mounted on the disc and active transversely to the guide groove. The severed end pieces 22 of the rolled goods are then lead away in one direction, while the cropped goods 23 is conveyed in another direction, for example to a coiler or some other collecting device.

In the illustrated embodiment introduction of the rolled goods 3 into the guide groove 2 around the periphery of the rotating circular disc 1 is shown to be effected with the aid of a tubular member 5 which can be aligned in relation to the disc and the groove arranged therein and through which the rolled goods moves in a direction towards said disc. Subsequent to being introduced into the peripheral guide groove 2 on the disc, the rolled goods is forced to accompany the disc, by means of a holding-down tool 6 arranged for movement in the radial direction of the disc. The defective front and tail ends of the rolled goods are cropped at the terminal point of the sector of the disc 1, which is covered by the holding down tool 6, and is carried out by means of the shearing device 4 attached to the disc and active transversely to the guide groove, the shearing device 4 being activated by means of the member 14 provided with the cam surface 15 and being mounted on one side of the disc for reciprocal movement in the direction of the axis of said disc. Upon completion of a cutting off cropping action, the rolled goods leaving the rotating disc is passed between the firmly mounted guide, provided with a goods-accommodating groove 17, and the two guides 18,19, co-acting with the guide channel means and movable in a direction towards and away from said groove, the guides 18,19 being effective to conduct the cropped rolled goods 23 to the guide channel intended therefor, and to guide the severed end pieces 22 of rolled goods to the guide channel 20 intended for said pieces.

The rotatable circular disc 1 may be mounted on a shaft having conventional bearings and suitably rotated by a variable speed drive means connected to the shaft. The transmission of the drive means, however, must be such as to enable the peripheral speed of the disc to be varied from a low value up to the value adapted to the high rolling speed in question.

In the aforegoing it has been made apparent several times that the invention is not restricted to the described and illustrated embodiment, and that many modifications can be carried out within the scope of the claims.

What I claim is:

1. A method for cropping the front and tail ends of fast-travelling rolled goods (3), comprising leading the rolled goods into a guide-groove (2) extending around the periphery of a circular disc (1), rotating said disc at a peripheral speed corresponding to the speed of the rolled goods and, while positively guided in this position, causing the rolled goods to accompany the disc over a sector (24), squeezing said rolled goods, while still firmly guided in the guide-groove, in the axial direction of the disc, cutting off said rolled goods at the end of said sector by means of a cutting device (4) mounted on the disc and movable transversely to the guide groove, and leading the separated end pieces (22) of the rolled goods in one direction and the cropped rolled goods (23) in another direction.

2. A method according to claim 1, characterized in that the rolled goods is introduced into the guide groove around the periphery of the rotating circular disc by means of a tubular member which can be aligned in relation to the disc and said groove and through which the rolled goods is caused to move.

3. A method according to claim 1, characterized in that the rolled goods is caused to accompany the disc while held in the peripheral guide groove thereon with the aid of a holding-down means arranged for movement towards the rolled goods in the radial direction of the disc.

4. A method according to claim 1, characterized in that the cutting device mounted on the disc and active transversely to the guide groove is activated by means of a member mounted on one side of the disc and incorporating a cammning surface, said member being arranged for reciprocal movement in the direction of the disc axis.

5. A method according to claim 1, characterized in that the rolled goods leaving the disc is conducted between a firmly mounted leader means, provided with a goods-receiving groove, and two guide means co-acting with said leader means and arranged for movement towards and away from said groove, wherewith cropped rolled goods is passed to a guide channel and separated pieces of the rolled goods are passed to a further guide channel, by adjusting the setting of the two manouverable guide means.

6. An apparatus for cropping the front and tail ends of fast-travelling rolled goods (3), wherein the apparatus comprises a circular disc (1) which around its periphery is provided with a guide groove (2) for receiving the rolled goods, and which circular disc is arranged to be given a peripheral speed corresponding to the speed of the rolled goods and carries a rolled-goods cutting device (4) which is active transversely to the guide groove and which is arranged to coact with anvil means (13) located on a part of the groove wall opposite the cutting device, holding-down means (6) which can be brought into abutment with the rolled-goods introduced into the groove on the periphery of the disc, said holding down means being mounted externally of the disc periphery and extending over a part thereof and being movable in the radial direction of the disc into and out of contact with the rolled-goods present in the guide groove.

7. Apparatus according to claim 6, characterized in that the apparatus includes a tubular member which is located upstream of the driven circular disc as seen in the direction of movement of the rolled goods and which can be aligned relative to the disc and the peripheral guide groove provided therein, said tubular member being effective in guiding the rolled goods into the guide groove on said disc.

8. Apparatus according to claim 6, characterized in that firmly mounted behind the disc, as seen in the direction of movement of the rolled goods is a guide channel which presents a rolled-goods accommodating groove over which two guide means are arranged, one after the other, said two guide means being manouverable towards and away from said groove, and further presents two guide channels which are located behind the groove and connected therewith, and which extend in mutually different directions of which guide channels a first is intended for conveying away the separated end pieces of rolled goods and the other is intended for passing away cropped rolled goods.

9. An apparatus according to claim 6, wherein the cutting device (4) carried by the disc (1) and active transversely to the guide groove (2) has the form of an element (8) mounted on the disc for reciprocal movement in the axial direction of the disc in a guide (7) extending transversely to the guide-groove, and which element extends partially beyond one side of the disc and there carries a camming surface (9) and the part of which element located within the guide is provided with a cutting edge (12), coacting with anvil means (13) located on a part of the groove wall opposite thereto, said anvil means having the form of a further cutting edge.

10. Apparatus according to claim 9, characterized in that the cutting device is activatable by means of a cam-provided member located on the side of the disc, this cam-provided member being manouverable forwards and backwards in the axial direction of the disc; and in that a return spring is arranged in a manner known per se to restore the cutting device to a rest position upon completion of a cropping movement, in which rest position the rolled goods is able to move in the guide groove without being affected by said cutting device.

* * * * *